United States Patent
Chaudhury et al.

(10) Patent No.: US 7,813,582 B1
(45) Date of Patent: Oct. 12, 2010

(54) METHOD AND APPARATUS FOR ENHANCING OBJECT BOUNDARY PRECISION IN AN IMAGE

(75) Inventors: Krishnendu Chaudhury, Karnataka (IN); Ashutosh Kulshreshtha, Karnataka (IN)

(73) Assignee: Google Inc., Mountain View, CA (US)

( * ) Notice: Subject to any disclaimer, the term of this patent is extended or adjusted under 35 U.S.C. 154(b) by 1051 days.

(21) Appl. No.: 11/527,294

(22) Filed: Sep. 25, 2006

(51) Int. Cl.
*G06K 9/40* (2006.01)
*G06K 9/00* (2006.01)

(52) U.S. Cl. ............................ 382/263; 382/167
(58) Field of Classification Search ................ 382/260, 382/263, 266, 162, 167; 358/3.27; 348/252, 348/625, 631
See application file for complete search history.

(56) References Cited

U.S. PATENT DOCUMENTS

| | | | |
|---|---|---|---|
| 6,600,517 B1 * | 7/2003 | He et al. .................... | 348/625 |
| 6,611,627 B1 * | 8/2003 | LaRossa et al. ............ | 382/240 |
| 2004/0207881 A1 * | 10/2004 | Nomura ..................... | 358/3.24 |
| 2006/0192897 A1 * | 8/2006 | Morphet .................... | 348/625 |
| 2008/0199101 A1 * | 8/2008 | Sumiya et al. ............. | 382/266 |

* cited by examiner

*Primary Examiner*—Yon Couso
(74) *Attorney, Agent, or Firm*—Park, Vaughan & Fleming LLP

(57) ABSTRACT

One embodiment of the present invention provides a system that enhances sharpness of object boundaries in an image. During operation, the system first receives an image. Next, the system computes gradients of color values for pixels in the image. The system then computes displacement vectors for pixels in the image, wherein the magnitude of the displacement vector for a given pixel is proportional to the magnitude of the gradient of the color value at the given pixel. The system next replaces the color values for the pixels, wherein the color value for a given pixel is replaced with a color value obtained from a location at the end of the displacement vector for the given pixel.

25 Claims, 8 Drawing Sheets
(3 of 8 Drawing Sheet(s) Filed in Color)

METHOD AND APPARATUS FOR ENHANCING OBJECT BOUNDARY PRECISION IN AN IMAGE

BACKGROUND

1. Field of the Invention

The present invention relates to techniques for enhancing digital images. More specifically, the present invention relates to a technique for enhancing clarity of an image by increasing the color contrast across object boundaries in the image.

2. Related Art

In many situations it is desirable to zoom into a portion of a digital image to view the portion in more detail. During a digital zoom operation, new pixels are typically added between existing pixels, and color values for these new pixels are interpolated from the color values of the surrounding pixels in the original image. However, pixel interpolation is an approximation process, so the image loses quality each time an interpolation operation is performed. In particular, pixel interpolation blurs object boundaries. This is because pixel interpolation averages color values of the surrounding pixels to obtain color values for a new pixel. As a result, high-contrast transitions of color values on or near object boundaries in the original image are rendered into more gradual transitions with lower contrast.

This boundary blurring can significantly degrade image quality, which can reduce viewing satisfaction, and can cause an unpleasant visual experience. Furthermore, in many cases, users want to edit zoomed-in versions of the original images. Unfortunately, the blurred boundaries can seriously degrade the precision of such user-editing operations. Hence, it is desirable to sharpen the blurred boundaries if possible to enhance overall clarity of the images and to facilitate user-editing operations.

Hence what is needed is a method and an apparatus for enhancing boundary sharpness without the above-described problems.

SUMMARY

One embodiment of the present invention provides a system that enhances sharpness of object boundaries in an image. During operation, the system first receives an image. Next, the system computes gradients of color values for pixels in the image. The system then computes displacement vectors for pixels in the image, wherein the magnitude of the displacement vector for a given pixel is proportional to the magnitude of the gradient of the color value at the given pixel. The system next replaces the color values for the pixels, wherein the color value for a given pixel is replaced with a color value obtained from a location at the end of the displacement vector for the given pixel.

In a variation on this embodiment, the system computes the gradients of color values by using a discrete differentiation operator.

In a variation on this embodiment, the system determines the direction of the displacement vector for a given pixel based on the direction of the gradient and the sign of the second derivative of the color value at the given pixel.

In a variation on this embodiment, if the end of the displacement vector falls between pixels, the system interpolates color values at the end of the displacement vector based on color values for neighboring pixels around the end of the displacement vector.

In a variation on this embodiment, prior to replacing the color values for the pixels, the system normalizes the magnitude of the displacement vector so that the largest magnitude among all displacement vectors does not exceed a predetermined maximum.

In a further variation on this embodiment, the system normalizes the magnitude of the displacement vector by: (1) ranking the magnitude of the displacement vector value among all the displacement vectors; (2) computing a percentile value for the displacement vector based on the associated rank; and (3) normalizing the magnitude of the displacement vector based on the associated percentile value and the magnitude of the displacement vector.

In a further variation on this embodiment, the system computes the percentile value for the displacement vector by computing a percentile $p=i/N$, wherein i is the rank and N is the total number of ranked displacement vectors.

In a further variation on this embodiment, the discrete differentiation operator is a Sobel operator.

In a further variation on this embodiment, the second derivative of the color value at the given pixel is computed using a Laplacian of Gaussian (LoG) filter.

In a further variation on this embodiment, the system interpolates the color values at the end of the displacement vector by using B-spline interpolation.

In a variation on this embodiment, the system receives the image from a video.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

The present invention generates a smooth vector field of displacements over an image, such that each pixel on the image has a displacement vector associated with it. The length of the displacement vector is proportional to the magnitude of the image intensity gradient at the location of the pixel. The direction of the displacement vector is parallel to the direction of the image intensity gradient at the location of the pixel and always points away from the dominant edge in the neighborhood. Hence, these displacement vectors typically have zero or small values in relatively uniform regions of the image, and large values in the vicinity of strong ("significant") edges or corners.

In order to increase the color contrast across the image boundaries, we effectively "warp" the image by this displacement vector field. During the warping process, color values of a pixel near a boundary are replaced with color values at a location away from the boundary along a line that is normal to the boundary. However, the warping leaves points in the uniform regions more or less undisturbed. Note that pairs of points at symmetrical locations on opposite sides of an edge "move" in opposite directions. As a result, these pairs of points get mapped to points that are further apart and hence are replaced with color values which are more different than before. The overall effect of the warping is an increased color contrast across the boundaries.

Enhancing a Blurred Boundary Using a Displacement Vector Field

Without losing generality, we describe the process of computing the displacement vector field using an one-dimension example. It should be apparent to one of ordinary skill in the art to extend the process to two dimensions and surfaces.

Figure 1A:
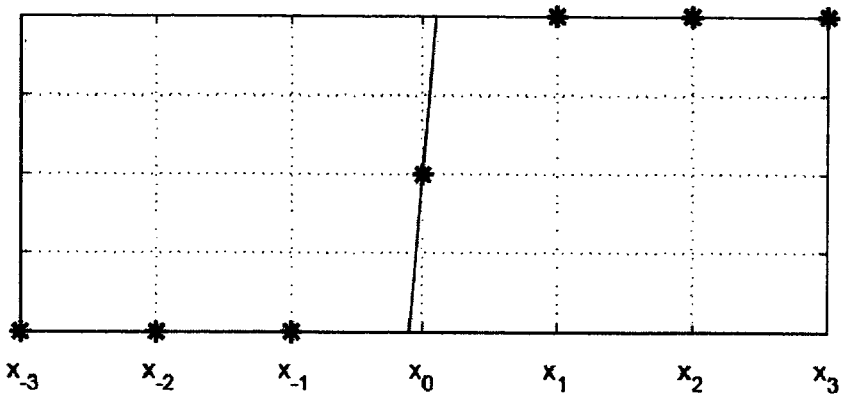
FIG. 1A illustrates an "ideal" step edge profile wherein the image intensity changes sharply in accordance with an embodiment of the present invention.

FIG. 1A illustrates an "ideal" step edge profile wherein the image intensity changes sharply in accordance with an embodiment of the present invention. In FIG. 1A, the horizontal axis represents pixel locations, e.g., $x_{-1}$, $x_0$, $x_1$, etc., and the vertical axis represents the image intensity. Note that in this ideal step edge, the abstract edge point (i.e., the point where the magnitude of the intensity gradient attains maxima) lies between the pair of pixels $x=x_{-1}$ and $x=x_1$. Hence, the step transition in intensity values is concentrated between these two pixels.

Figure 1B:
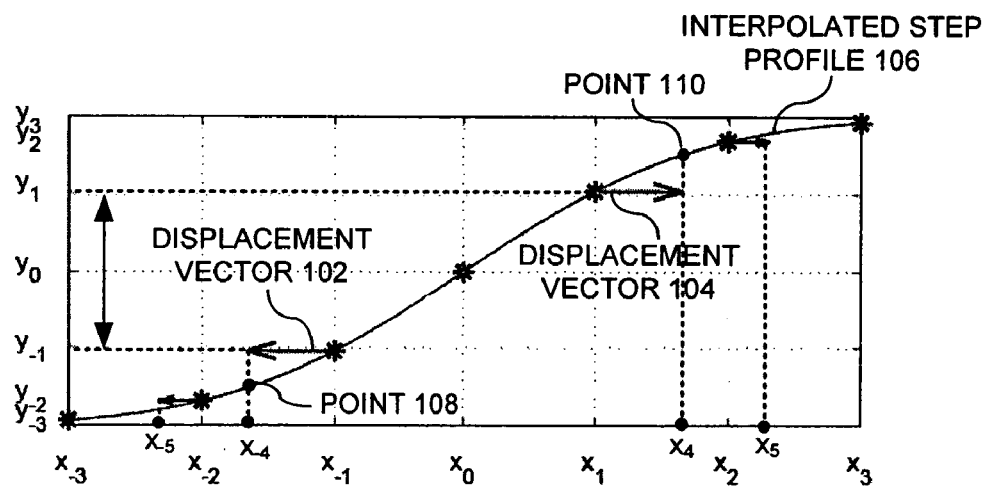
FIG. 1B illustrates an exemplary "blurred" edge profile wherein the image intensity change is gradual in accordance with an embodiment of the present invention.

However in an actual image, an edge transition is typically not ideal, i.e., the entire intensity jump may not occur across a single pair of pixels. FIG. 1B illustrates an exemplary "blurred" step edge profile wherein the image intensity change is gradual in accordance with an embodiment of the present invention. Note that initially the intensity value increases slightly from $y_{-3}$ at $x_{-3}$ to $y_{-1}$ at $x_{-1}$. Next it takes a bigger jump to reach $y_1$ at $x_1$, which is followed by smaller jumps to reach $y_3$ at $x_3$ to complete the step edge transition. Hence, the entire step edge spreads over seven pixel distance, which effectively represents a blurred edge in comparison to the ideal edge in FIG. 1A. Once again, the abstract edge point lies somewhere between the pixels $x=x_{-1}$ and $x=x_1$.

In order to enhance the sharpness of the blurred edge in FIG. 1B, we compute a displacement vector for each pixel in the edge, which is shown by arrows attached to the pixels. Note that the length of the displacement vector associated with a pixel is proportional to the magnitude of the intensity gradient at that pixel. For example, the location at pixel $x_1$ is associated with a larger gradient than the location at pixel $x_2$. Consequently, the displacement vector for pixel $x_1$ is longer than the displacement vector for pixel $x_2$. On the other hand, because intensity gradients at pixels $x_1$ and $x_{-1}$ have similar values, the lengths of the displacement vectors at these two pixels are substantially equal. Also note that the gradient diminishes as pixels "move away" from the edge and becomes zero in the uniform region.

Furthermore, the direction of the displacement vector is oriented parallel (or anti-parallel) to the intensity gradient, while the sense of the displacement vector at a given pixel always points away from the edge. For example, in the one-dimension edge profile of FIG. 1B, displacement vectors 102, and 104 are both parallel to the horizontal axis, but point away from the abstract edge point between pixels $x_{-1}$ and $x_1$. In one embodiment of the present invention, the sense of the displacement vector can be determined from the sign of a second derivative of a color value at the given pixel.

We describe how to compute the displacement vector for a given pixel in more detail below.

When the displacement vector field is computed for the image, the image is then "warped" according to the displacement vector field. More specifically, each pixel in the edge has its current intensity value replaced with the intensity value at a point located at the end of the displacement vector associated with that pixel.

Note that the displacement vectors map points closer to an edge to points further away from the edge. For example, pixels $x_{-1}$ and $x_1$ will receive new intensity values from points $x_{-4}$ and $x_4$, respectively, while pixels $x_{-2}$ and $x_2$ will receive new intensity values from points $x_{-5}$ and $x_5$, respectively.

Note that points $x_{-4}$, $x_4$ and $x_{-5}$, $x_5$ are in-between pixels and hence do not have assigned intensity values. In one embodiment of the present invention, the intensity values of these in-between points are interpolated from intensity values associated with the neighboring pixels. For example, an interpolated step profile 106 can be obtained using a simple quadratic interpolation. Thus, the intensity values at these in-between points are derived from the corresponding points in interpolated step profile 106, such as points 108 and 110.

Note that for two-dimensional images and surface objects, interpolating color values for these in-between points involves using more complex interpolation techniques, such as a Bi-Cubic B-spline interpolation.

Figure 1C:
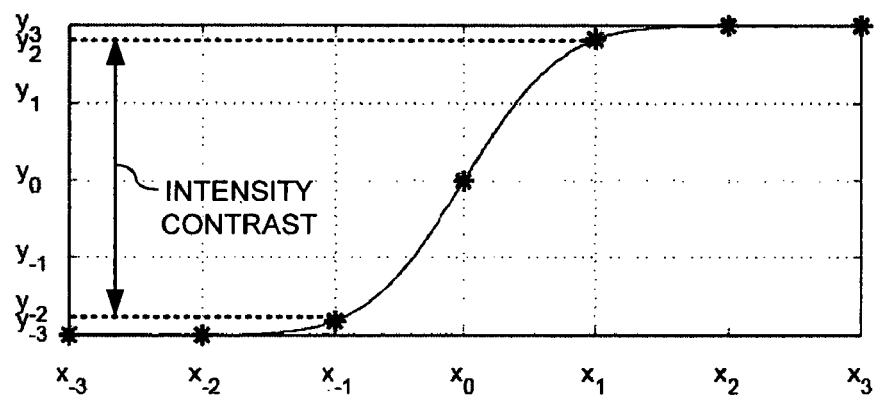
FIG. 1C illustrates an exemplary enhancement of the blurred edge in FIG. 1B in accordance with an embodiment of the present invention.

FIG. 1C illustrates an exemplary enhancement of the blurred edge in FIG. 1B which was generated using displacement vectors in accordance with an embodiment of the present invention.

Note that the intensity contrast between pixels $x_{-1}$ and $x_1$ was $(y_1-y_{-1})$ in FIG. 1B prior to the enhancement. After the enhancement, the intensity contrast between pixels $x_{-1}$ and $x_1$ becomes $(y_2-y_{-2})$, which is larger in an absolute magnitude. Hence, this enhancement process increases the intensity difference between opposing pixels across the edge which "sharpens" the edge.

Figure 2:
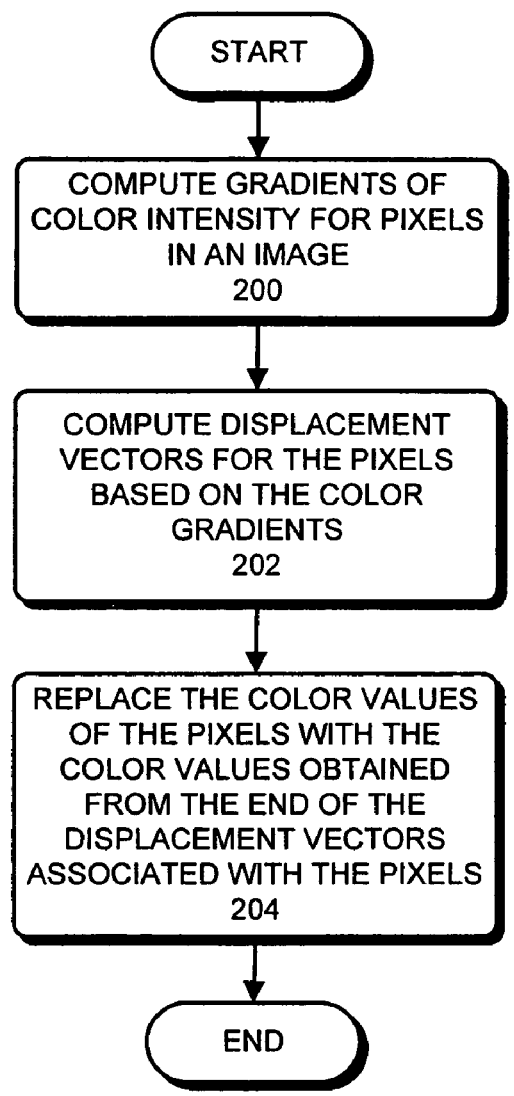
FIG. 2 presents a flowchart illustrating the process of enhancing sharpness of an object boundary using displacement vectors in accordance with an embodiment of the present invention.

FIG. 2 presents a flowchart illustrating the process of enhancing the sharpness of an object boundary using displacement vectors in accordance with an embodiment of the present invention. The process starts by computing gradients of color intensity values for pixels in the image (step 200). In a gray-scale image, this computation only generates one gradient vector at each pixel in the image. However, for a color image, computing the gradients involves computing gradient vectors for the R, G, and B color components at each pixel in the image. In one embodiment of the present invention, computing the gradients of color values involves using a discrete differentiation operator.

Next, the process computes displacement vectors for the pixels in the image, wherein the magnitude of the displacement vector for a given pixel is proportional to the magnitude of the gradient of a color value at the given pixel, the direction of the displacement vector is parallel to the direction of the gradient vector at the given pixel, and the sign of the displacement vector is determined by the second derivative of the color value at the given pixel (step 202).

The process then replaces the color value/values at the pixels based on the displacement vectors (step 204). Specifically, a color value for a given pixel is replaced with a color value obtained from a location at the end of the displacement vector for the given pixel.

Computing the Displacement Vector

In the previous section, we noted that the length and orientation of a displacement vector for a pixel is obtained from the intensity gradient at that pixel. The intensity gradient at a given pixel can be computed in different ways. In one embodiment of the present invention, computing the gradients involves using a discrete differentiation operator, such as a Sobel operator. Specifically, the Sobel operation computes the intensity gradient $$\nabla I = \left[\frac{\partial I}{\partial x} \frac{\partial I}{\partial y}\right]^T,$$

where I denotes an image intensity. Thus, the magnitude of the intensity gradient, i.e., the length of the displacement vector, is given by $\|\nabla I\|$, while the direction of the intensity gradient/displacement vector is given by the unit vector along $\|\nabla I\|$.

In another embodiment of the present invention, one can use a gradient tensor (see "A Combined Corner and Edge Detector," by Harris C. et al., Fourth Alvey Vision Conference, 1988, pp. 147-151.) to compute the intensity gradient and subsequently obtain the displacement vector.

Specifically, given a 2D image intensity function, $I(x, y)$, its gradient tensor is given by a 2×2 matrix $H(x, y)$:

$$H(x, y) = g_\sigma(x, y) * (\nabla I \nabla I^T) = g_\sigma(x, y) * \begin{bmatrix} I_x^2 & I_x I_y \\ I_x I_y & I_y^2 \end{bmatrix},$$

wherein $g_\sigma(x, y)$ denotes Gaussian of standard deviation $\sigma$, * denotes the convolution operator, and the subscripts denote partial derivatives with respect to x and y. Furthermore, at a given pixel location $(x, y)$, the two eigenvalues of $H(x, y)$, $\lambda_1$ and $\lambda_2$, measure the edge and corner characteristics at that pixel point.

More specifically, if both $\lambda_1$ and $\lambda_2$ are substantially "close" to zero, the pixel point is characterized as a uniform intensity point, i.e., neither an edge point, nor a corner point. However, if both $\lambda_1$ and $\lambda_2$ are "large", the pixel point is characterized as a corner point. Furthermore, if $\lambda_1$ is "large" but $\lambda_2$ is "small", the pixel point is characterized as an edge point.

In this last case, the value of $\lambda_1$ provides a measurement of the edge strength (i.e., the length of displacement vector). Moreover, the eigenvector of $H(x, y)$ corresponding to $\lambda_1$ provides the orientation of the intensity gradient vector (i.e., the orientation of the displacement vector). Thus, in this approach, one creates a displacement vector field $$\begin{bmatrix} u(x, y) \\ v(x, y) \end{bmatrix} = \lambda_1 \hat{e}(x, y),$$

wherein $\hat{e}(x, y)$ is the unit length eigenvector of $H(x, y)$ corresponding to eigenvalue $\lambda_1$.

Determining the Sense of the Displacement Vector

The previous section describes how the length and orientation of the displacement vectors are computed. In this section, we describe a technique which determines the "sense" of these displacement vectors. We follow the general rule that displacement vectors located symmetrically on opposite sides of a boundary should point in opposite directions.

In one embodiment of the present invention, the sense of the displacement vector for a given pixel is obtained from the sign of a second derivative of the color intensity at the given pixel, due to the fact that the second derivative typically displays opposite signs on opposite sides of an image boundary.

In one embodiment of the present invention, the second derivative of the color intensity at a given pixel is computed using a Laplacian of Gaussian (LoG) operator, which is commonly used to detect areas of rapid intensity change (e.g., edges) in an image. Specifically, a Laplacian operator computes the second derivative of an image. However, because derivative operators are particularly sensitive to noise, the image is typically smoothed (e.g., using a Gaussian filter) prior to applying the Laplacian operator. Hence the LoG operator performs two-step process on an image: smoothing the image with a Gaussian filter, and then taking the second derivative with the Laplacian operator.

Because of the second derivative, in the regions where the intensity is uniform, the LoG operator yields zero. On the other hand, when an edge is presented in the image, the response to the LoG operator is positive on one side of the edge and negative on the other side. On or near the edge location, the response is close to zero. Accordingly, let LoG $(x, y)$ be the output of a LoG operation on an image $I(x, y)$:

LoG$(x, y)=\nabla^2 g(x, y, \sigma)*I(x, y)$, then the sense of the displacement vector $s(x, y)$ are determined according to:

$$s(x, y) = \begin{cases} 1 & \text{if } L(x, y) > T, \\ -1 & \text{if } L(x, y) < -T, \\ 0 & \text{otherwise,} \end{cases}$$

wherein T is a predetermined threshold value and 0s demarcate the boundary.

Figure 3:
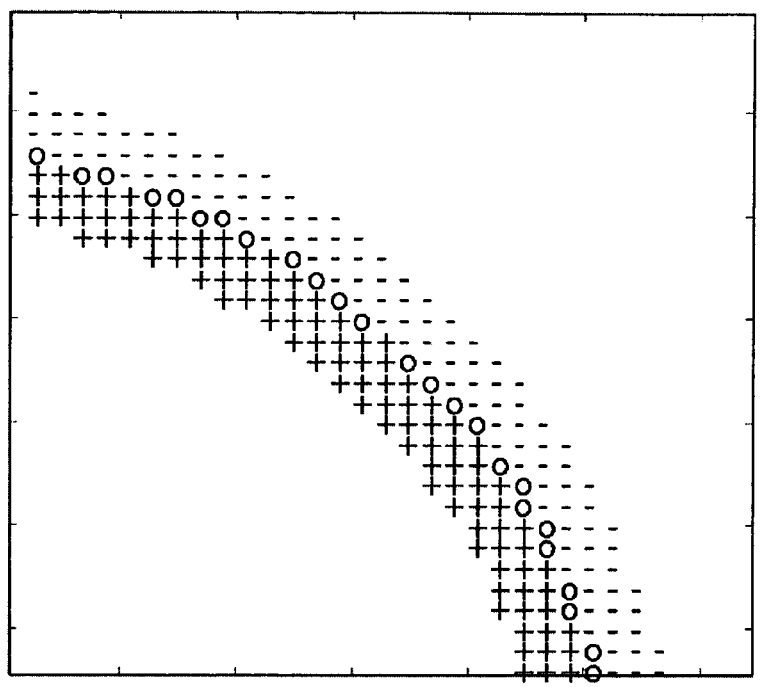
FIG. 3 illustrates signs computed by a LoG operator for the displacement vectors along an edge in accordance with an embodiment of the present invention.

FIG. 3 illustrates signs computed by a LoG operator for the displacement vectors along an edge in accordance with an embodiment of the present invention. Note that "0"s demarcate the edge and the "+"s/"−"s identify different sides of the edge and sense of the displacement vectors.

Normalizing the Displacement Vector

In one embodiment of the present invention, the magnitudes of the computed displacement vectors are normalized so that the largest magnitude among all displacement vectors does not exceed certain predetermined maximum value. In one embodiment of the present invention, the predetermined maximum value is set to 1, which represents one pixel distance. Note that without normalization, the magnitude of a displacement vector can have a very large or very small value, which can cause false or ineffective result. For example, a substantially long displacement vector can end up at a different color contrast area far away from the edge which the displacement vector is associated with.

Although the normalization can be done simply by setting the largest magnitude to 1 and scaling the others displacement vector linearly, this approach has a problem: a single unusually long vector (e.g., an outlier) somewhere in the field would effectively scale all other vectors to insignificantly small values, thereby losing any effectiveness during a subsequent warping process.

Figure 4:
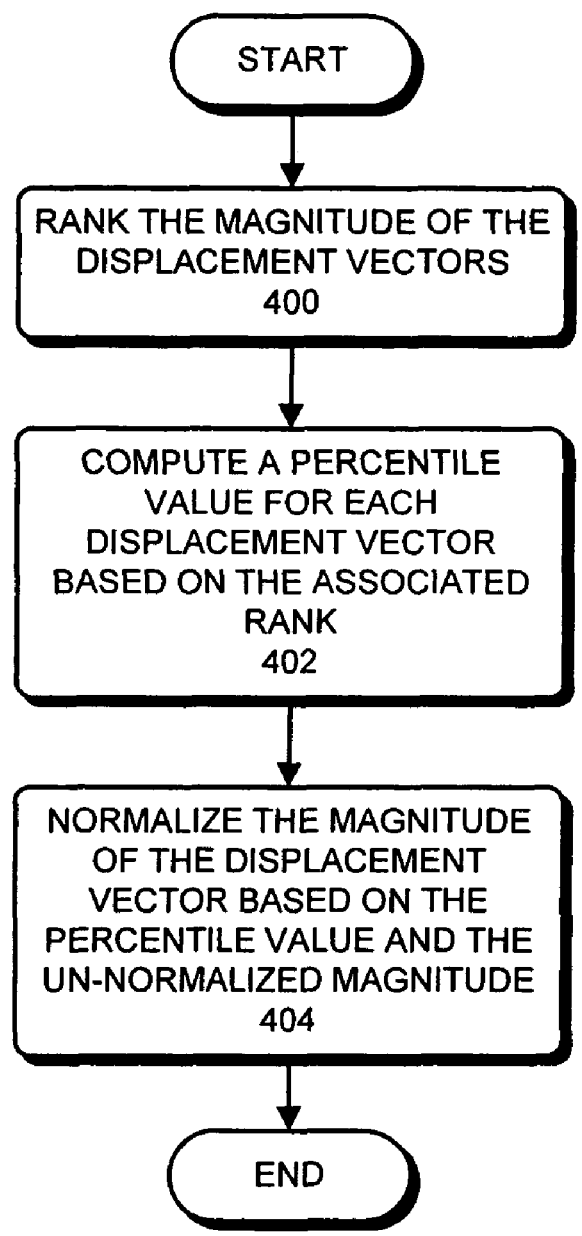
FIG. 4 presents a flowchart illustrating the process of normalizing displacement vectors to neutralize the effect of large outliers in accordance with an embodiment of the present invention.

FIG. 4 presents a flowchart illustrating the process of normalizing displacement vectors to neutralize the effect of large outliers in accordance with an embodiment of the present invention.

The process starts by ranking the magnitude of the displacement vector among all the displacement vectors into a one-dimensional array (step 400). In one embodiment of the present invention, the smallest magnitude is assigned an index of 1, the next smallest with an index 2, and so on. If N represents the total number of ranked displacement vectors, then the largest displacement vector receives an index N.

Next, the process computes a percentile value for the displacement vector based on the its rank in the array (step 402). Specifically, for a displacement vector in the array, the associated percentile p is computed as i/N, wherein i is the rank/index of the displacement vector in the array. Hence, the maximum displacement vector receives a percentile of 100% while the minimum value gets a percentile of 1%.

The process then normalizes the magnitude of the displacement vector based on the associated percentile p and the un-normalized magnitude M of the displacement vector (step 404).

In one embodiment of the present invention, the normalized magnitude, $M_n$, for the un-normalized magnitude M is computed using the following equation:

$$M_n = \frac{M \cdot p}{(p + a \cdot e^{(1-b \cdot p)})}.$$

Note that the above formula simulates an S-shaped curve which is characterized with two predetermined percentiles. More specifically, displacement vectors with un-normalized magnitudes M below the first (i.e., the smaller) predetermined percentile is pushed close to zero after the normalization, while displacement vectors with un-normalized magnitudes M above the second (i.e., the larger) predetermined percentile gets the saturation magnitude of 1 after normalization. In one embodiment of the present invention, parameters a and b in the equation are chosen to set the first and second percentiles to 30th and 63rd respectively. In doing so, the process eliminates the problem associated with a few outliers among the displacement vectors.

Figure 5:
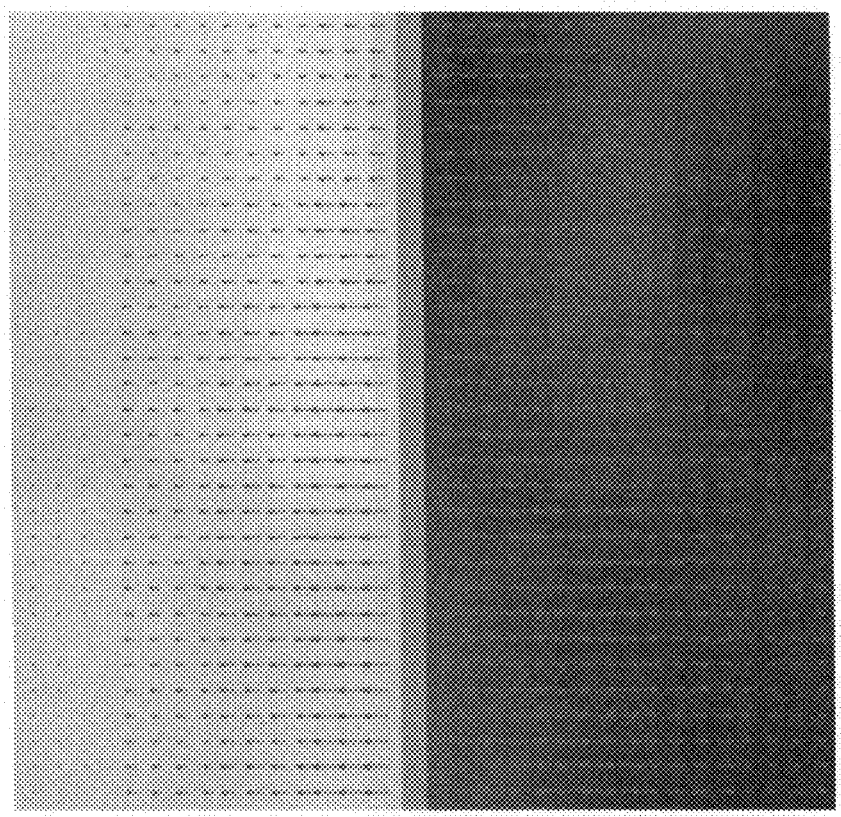
FIG. 5 illustrates a displacement vector field actually computed near an edge in an image using the proposed process in accordance with an embodiment of the present invention.

FIG. 5 illustrates a displacement vector field actually computed near an edge in an image using the proposed process in accordance with an embodiment of the present invention. Note that the arrows (the displacement vectors) reduce in length as they move away from the edge which runs through the centerline of the figure. Also note the magnitude are approximately zero on the edge and differ in signs on the opposite sides of the edge.

Applying the Technique to a Color Image

Figure 6A:
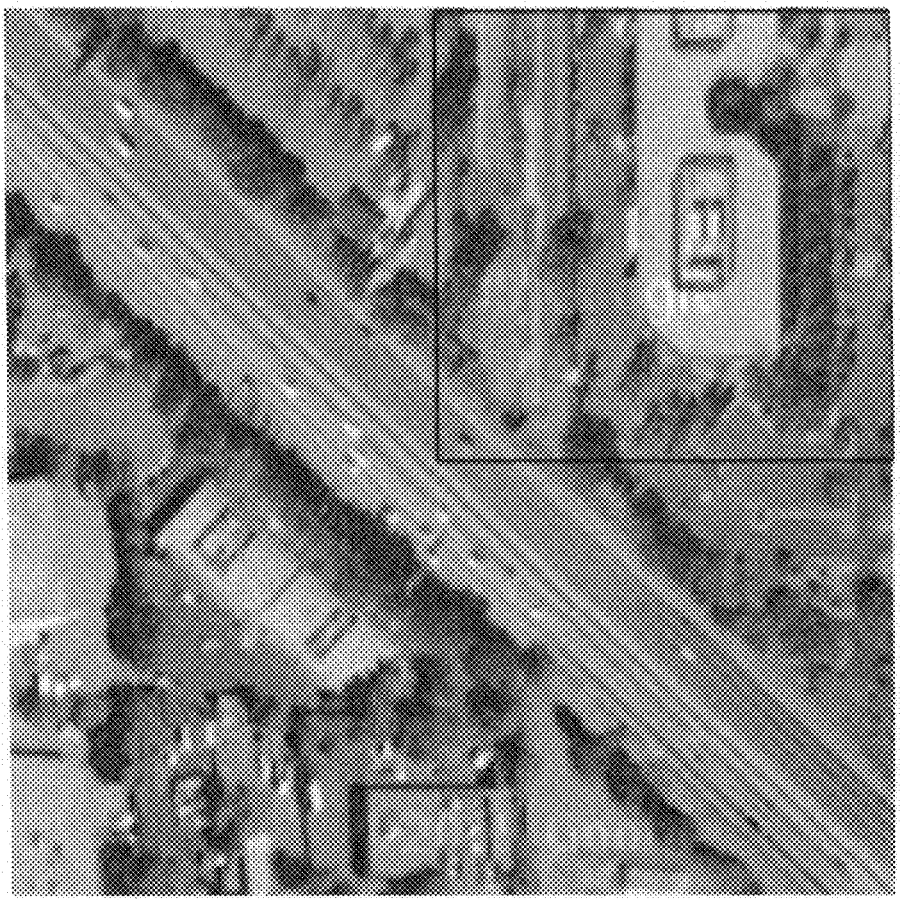
FIG. 6A presents a satellite image of an area near Google-Plex, Mountain View, Calif.

FIG. 6A presents a satellite image of an area near GooglePlex, Mountain View, Calif. Note that the area enclosed within the black rectangle in the upper right corner will be magnified (zoomed-in).

Figure 6B:
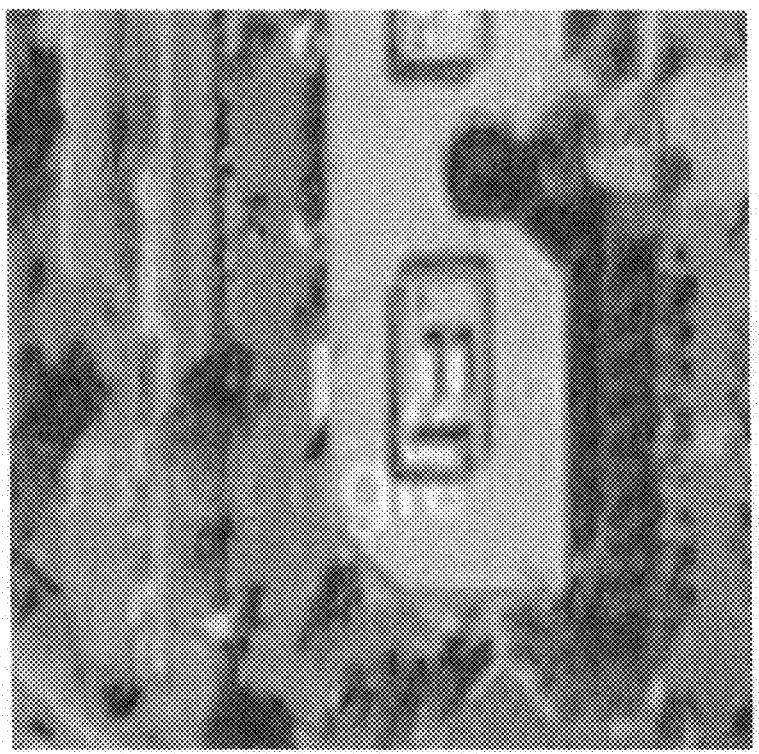
FIG. 6B presents a magnified image of the selected area in FIG. 6A, which is generated from the original image using super-sampled 4×4 Bi-Cubic interpolation.

FIG. 6B presents a magnified image of the selected area in FIG. 6A, which is generated from the original image using super-sampled 4×4 Bi-Cubic interpolation. Note the effect of boundary blurring as a result of the pixel interpolation process.

Figure 6C:
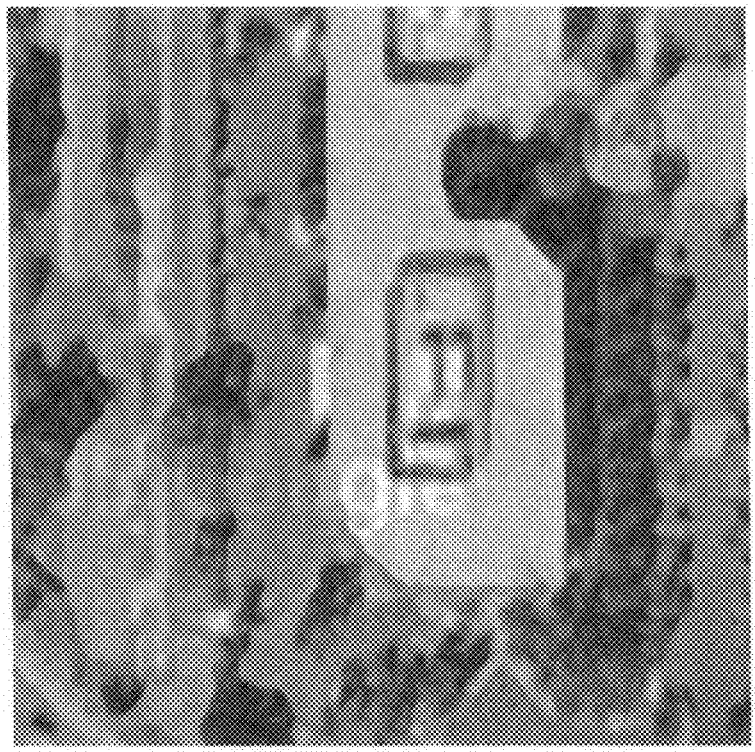
FIG. 6C presents an enhanced version of the image from FIG. 6B which was generated using the boundary sharpening technique in accordance with an embodiment of the present invention.

FIG. 6C presents an enhanced version of the image from FIG. 6B which was generated using the boundary sharpening technique in accordance with an embodiment of the present invention.

Note that the present invention is not limited to enhancing blurred boundaries resulting from image magnification. The technique of using displacement vectors to enhance image quality can generally be applied to any image with blurred boundaries.

Applying the Technique to Videos

Note that the present invention can also be used to enhance resolution in a video, for example, a low resolution VCD video. Specifically, a given video file can be partitioned into a sequence of frames (i.e., a sequence of images), wherein each frame can be processed as an image. Next, the system can apply the above-described boundary sharpening technique to the individual frames, thereby enhancing boundary sharpness for the sequence of frames. Eventually, the processed frames can be recombined to produce a video with enhanced resolution.

Applying the Technique to Analog Images

Note that although the present invention is generally directed to perform operations on digital images comprising pixels, the general technique may also be applied to analog images. In one embodiment of the present invention, a 2D mesh can be overlaid over a given analog image, wherein gradients of color values and the corresponding displacement vectors can be computed for those grids points in the 2D mesh which are corresponding to a boundary. Specifically, the computations at the grid points can be performed in the same manner as for the pixels. Note that the color values at the end of the displacement vectors from the grid points can be obtained directly from the original analog image.

In another embodiment of the present inventions, a given analog image can be first digitized to create a corresponding digital image, which can be subsequently processes by using the above-described procedures on pixels.

Figure 7:
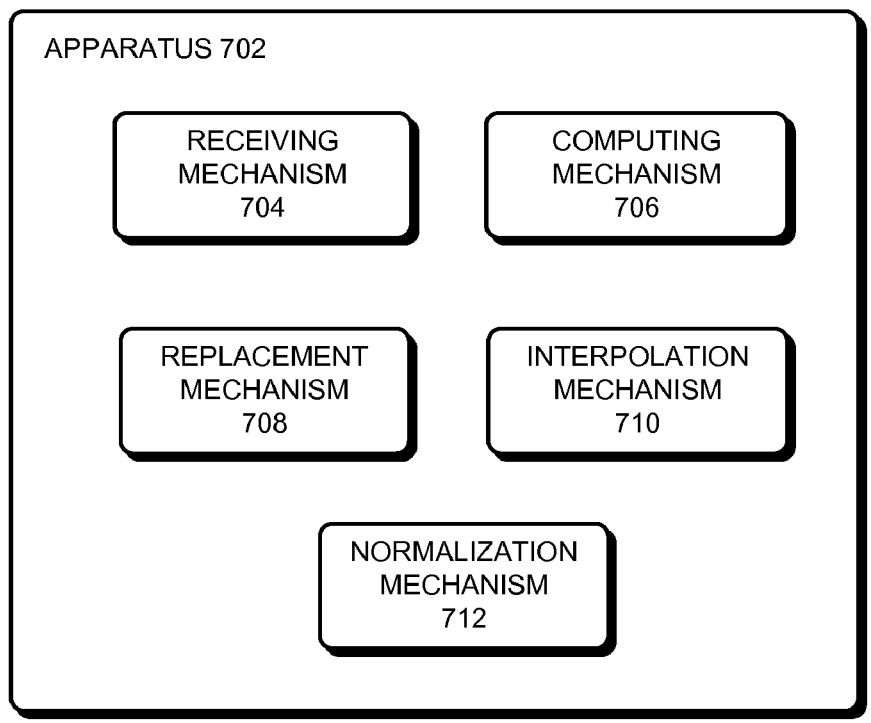
FIG. 7 illustrates an apparatus that enhances sharpness of object boundaries in an image in accordance with an embodiment of the present invention.

FIG. 7 illustrates an apparatus 702 that enhances sharpness of object boundaries in an image in accordance with an embodiment of the present invention.

Apparatus 702 can comprise mechanisms which communicate with one another via a wired or wireless communication channel. Specifically, apparatus 702 can comprise a receiving mechanism 704, a computing mechanism 706, a replacement mechanism 708, an interpolation mechanism 710, and a normalization mechanism 712. Apparatus 702 can be part of a computer system.

In some embodiments, receiving mechanism 704 may be configured to receive an image; computing mechanism 706 may be configured to compute gradients of color values for pixels in the image and to compute displacement vectors for pixels in the image; replacement mechanism 708 may be configured to replace the color values for pixels, wherein a color value for a given pixel is replaced with a color value obtained from a location at the end of the displacement vector for the given pixel; interpolation mechanism 710 may be configured to interpolate color values at the end of the displacement vector based on color values for neighboring pixels around the end of the displacement vector; and normalization mechanism 712 may be configured to normalize the magnitude of the displacement vector so that the largest magnitude among all displacement vectors does not exceed a predetermined maximum.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enhancing sharpness of object boundaries in an image, comprising:
using one or more computers for:
receiving an image;
computing gradients of color values for pixels in the image;
computing displacement vectors for pixels in the image, wherein the magnitude of a displacement vector for a given pixel is proportional to the magnitude of a gradient of a color value at the given pixel; and
replacing the color values for pixels, wherein a color value for a given pixel is replaced with a color value obtained from a location at the end of the displacement vector for the given pixel.

2. The method of claim 1, wherein computing the gradients of color values involves using a discrete differentiation operator.

3. The method of claim 1, wherein the direction of the displacement vector for a given pixel is determined based on the direction of the gradient and the sign of a second derivative of a color value at the given pixel.

4. The method of claim 1, wherein if the end of the displacement vector falls between pixels, the method further comprising interpolating color values at the end of the displacement vector based on color values for neighboring pixels around the end of the displacement vector.

5. The method of claim 1, wherein prior to replacing the color values for the pixels, the method further comprises normalizing the magnitude of the displacement vector so that the largest magnitude among all displacement vectors does not exceed a predetermined maximum.

6. The method of claim 5, wherein normalizing the magnitude of the displacement vector involves:
ranking the magnitude of the displacement vector value among all the displacement vectors;
computing a percentile value for the displacement vector based on the associated rank; and
normalizing the magnitude of the displacement vector based on the associated percentile value and the magnitude of the displacement vector.

7. The method of claim 6, wherein computing the percentile value for the displacement vector based on the associated rank involves computing a percentile $p=i/N$, wherein i is the rank and N is the total number of ranked displacement vectors.

8. The method of claim 2, wherein the discrete differentiation operator is a Sobel operator.

9. The method of claim 3, wherein the second derivative of the color value at the given pixel is computed using a Laplacian of Gaussian (LoG) filter.

10. The method of claim 4, wherein interpolating the color values at the end of the displacement vector involves using a B-spline interpolation.

11. The method of claim 1, wherein receiving the image involves receiving the image from a video.

12. A computer-readable storage medium storing instructions that when executed by a computer cause the computer to perform a method for enhancing sharpness of object boundaries in an image, the method comprising:
receiving an image;
computing gradients of color values for pixels in the image;
computing displacement vectors for pixels in the image, wherein the magnitude of a displacement vector for a given pixel is proportional to the magnitude of a gradient of a color value at the given pixel; and
replacing the color values for pixels, wherein a color value for a given pixel is replaced with a color value obtained from a location at the end of the displacement vector for the given pixel.

13. The computer-readable storage medium of claim 12, wherein computing gradients of color values involves using a discrete differentiation operator.

14. The computer-readable storage medium of claim 12, wherein the direction of the displacement vector for a given pixel is determined based on the direction of the gradient and the sign of a second derivative of a color value at the given pixel.

15. The computer-readable storage medium of claim 12, wherein if the end of the displacement vector falls between pixels, the method further comprising interpolating color values at the end of the displacement vector based on color values for neighboring pixels around the end of the displacement vector.

16. The computer-readable storage medium of claim 12, wherein prior to replacing the color values for the pixels, the method further comprises normalizing the magnitude of the displacement vector so that the largest magnitude among all displacement vectors does not exceed a predetermined maximum.

17. The computer-readable storage medium of claim 16, wherein normalizing the magnitude of the displacement vector involves:
ranking the magnitude of the displacement vector value among all the displacement vectors;

computing a percentile value for the displacement vector based on the associated rank; and normalizing the magnitude of the displacement vector based on the associated percentile value and the magnitude of the displacement vector.

18. The computer-readable storage medium of claim 17, wherein computing the percentile value for the displacement vector based on the associated rank involves computing a percentile p=I/N, wherein i is the rank and N is the total number of ranked displacement vectors.

19. The computer-readable storage medium of claim 12, wherein receiving the image involves receiving the image from a video.

20. An apparatus that enhances sharpness of object boundaries in an image, comprising:

a processor;

a memory;

a receiving mechanism configured to receive an image;

a computing mechanism coupled to the processor configured to compute gradients of color values for pixels in the image;

wherein the computing mechanism is further configured to compute displacement vectors for pixels in the image, wherein the magnitude of a displacement vector for a given pixel is proportional to the magnitude of a gradient of a color value at the given pixel; and a replacement mechanism coupled to the processor configured to replace the color values for pixels, wherein a color value for a given pixel is replaced with a color value obtained from a location at the end of the displacement vector for the given pixel.

21. The apparatus of claim 20, wherein the computing mechanism is configured to determine the direction of the displacement vector for a given pixel based on the direction of the gradient and the sign of a second derivative of a color value at the given pixel.

22. The apparatus of claim 20, further comprising an interpolation mechanism configure to interpolate color values at the end of the displacement vector based on color values for neighboring pixels around the end of the displacement vector.

23. The apparatus of claim 20, further comprising a normalization mechanism configured to normalize the magnitude of the displacement vector so that the largest magnitude among all displacement vectors does not exceed a predetermined maximum.

24. The apparatus of claim 23, wherein the normalization mechanism is configured to:

rank the magnitude of the displacement vector value among all the displacement vectors;

compute a percentile value for the displacement vector based on the associated rank; and to normalize the magnitude of the displacement vector based on the associated percentile value and the magnitude of the displacement vector.

25. An apparatus that enhances sharpness of object boundaries in an image, comprising:

a processor;

a memory;

a receiving mechanism configured to receive an image;

a computing mechanism coupled to the processor configured to compute gradients of color values for grid points in the image;

wherein the computing mechanism is further configured to compute displacement vectors for grid points in the image, wherein the magnitude of a displacement vector for a given grid point is proportional to the magnitude of a gradient of a color value at the grid point; and a replacement mechanism coupled to the processor configured to replace the color values for grid points, wherein a color value for a given grid point is replaced with a color value obtained from a location at the end of the displacement vector for the given grid point.

* * * * *